US010838506B2

(12) United States Patent
Tyagi et al.

(10) Patent No.: US 10,838,506 B2
(45) Date of Patent: Nov. 17, 2020

(54) GESTURE BASED OBJECT IDENTIFICATION APPARATUS AND METHOD IN A REAL TIME LOCATING SYSTEM

(71) Applicant: MOTOROLA MOBILITY LLC, Chicago, IL (US)

(72) Inventors: Vivek Tyagi, Chicago, IL (US); Douglas Lautner, Round Lake, IL (US); Sudhir Vissa, Bensenville, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 258 days.

(21) Appl. No.: 15/782,764

(22) Filed: Oct. 12, 2017

(65) Prior Publication Data

US 2019/0113979 A1    Apr. 18, 2019

(51) Int. Cl.
*G06K 9/00* (2006.01)
*G06F 3/01* (2006.01)
*G06K 19/077* (2006.01)

(52) U.S. Cl.
CPC ......... *G06F 3/017* (2013.01); *G06K 9/00335* (2013.01); *G06K 19/07749* (2013.01)

(58) Field of Classification Search
None
See application file for complete search history.

(56) References Cited

U.S. PATENT DOCUMENTS

| 9,934,587 | B2* | 4/2018 | Senthamil | G06T 19/006 |
| 10,088,549 | B2* | 10/2018 | Nielsen | G01S 5/0263 |
| 2002/0164997 | A1* | 11/2002 | Parry | H04L 29/06 455/456.1 |
| 2008/0192116 | A1* | 8/2008 | Tamir | G06T 7/292 348/157 |
| 2015/0163764 | A1* | 6/2015 | Stern | H04N 7/18 348/143 |
| 2018/0196585 | A1* | 7/2018 | Densham | H04N 9/31 |
| 2019/0080157 | A1* | 3/2019 | Lev | G06K 9/00342 |

* cited by examiner

*Primary Examiner* — Soo Jin Park
(74) *Attorney, Agent, or Firm* — Cygan Law Offices P.C.; Joseph T. Cygan

(57) ABSTRACT

A method of operating a real time locating system (RTLS) includes: obtaining object gesture pattern data for an RTLS tagged object, in response to a gesture pattern motion of the RTLS tagged object; receiving camera gesture pattern data from a video camera, in response to the gesture pattern motion of the RTLS tagged object; determining that the object gesture pattern data matches the camera gesture pattern data; and sending the RTLS coordinates of the RTLS tagged object to a monitoring device, in response to the object gesture pattern data matching the camera gesture pattern data.

8 Claims, 7 Drawing Sheets

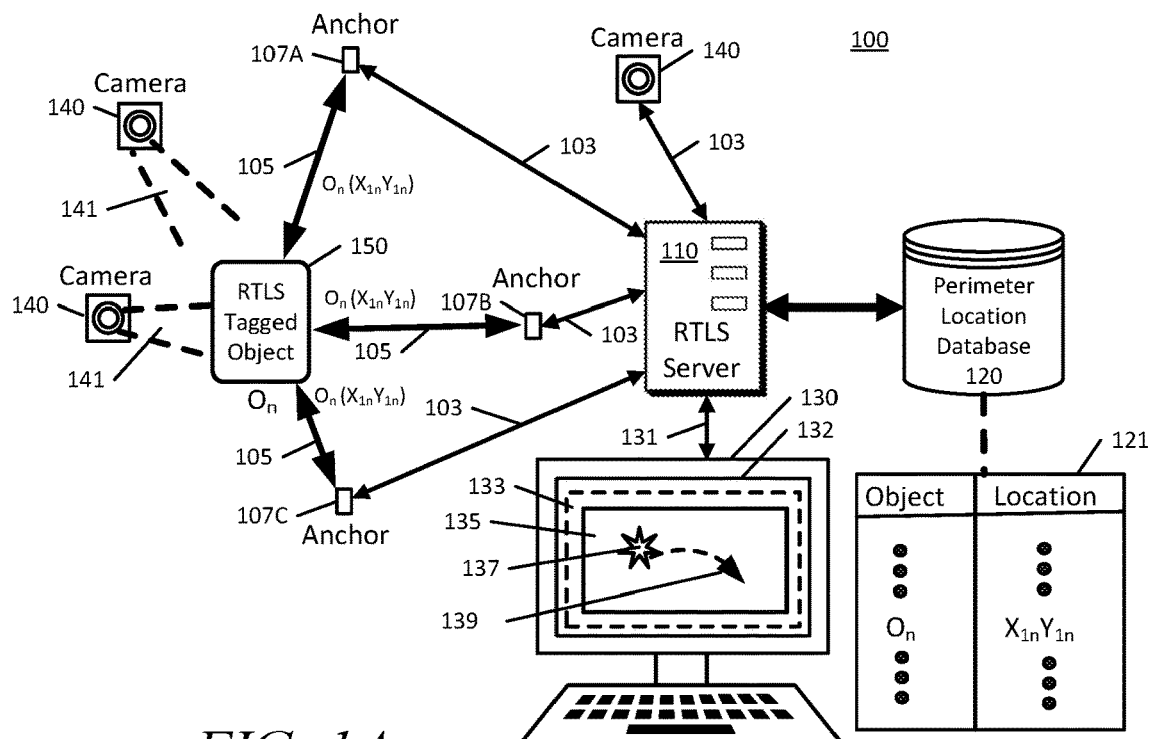
FIG. 1A
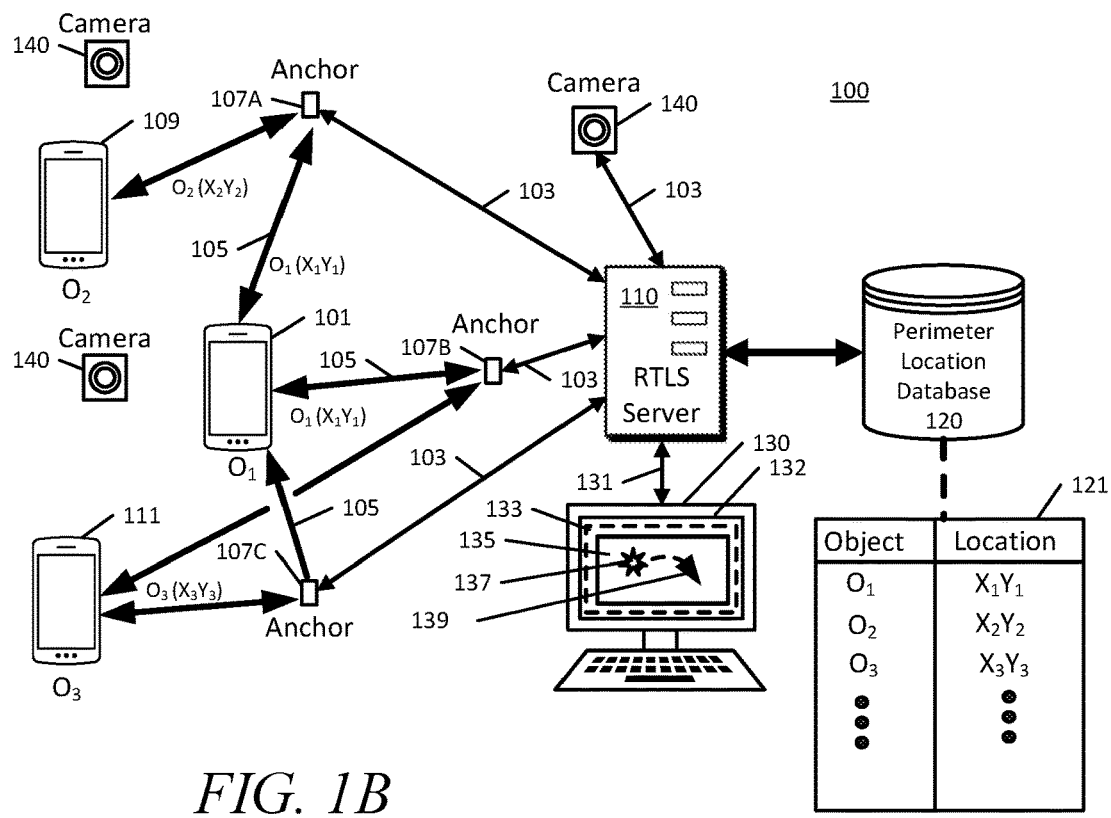
FIG. 1B
FIG. 1

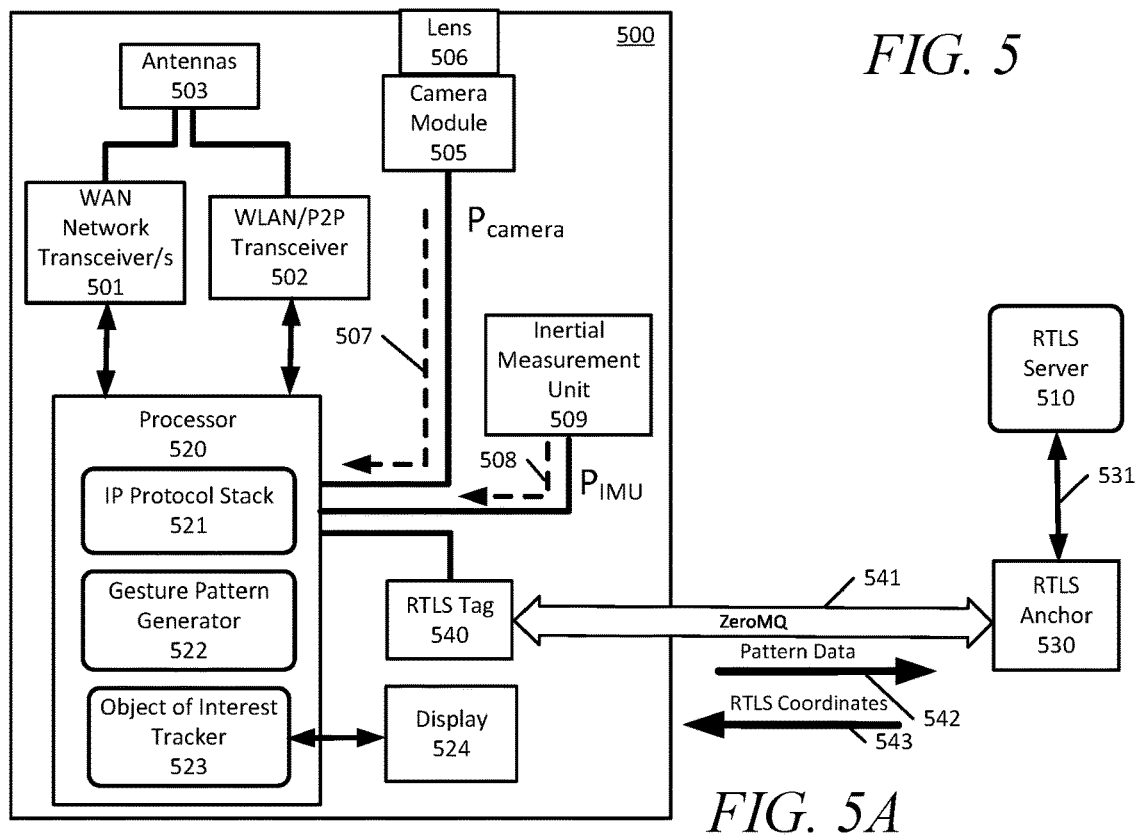
FIG. 5
FIG. 5A
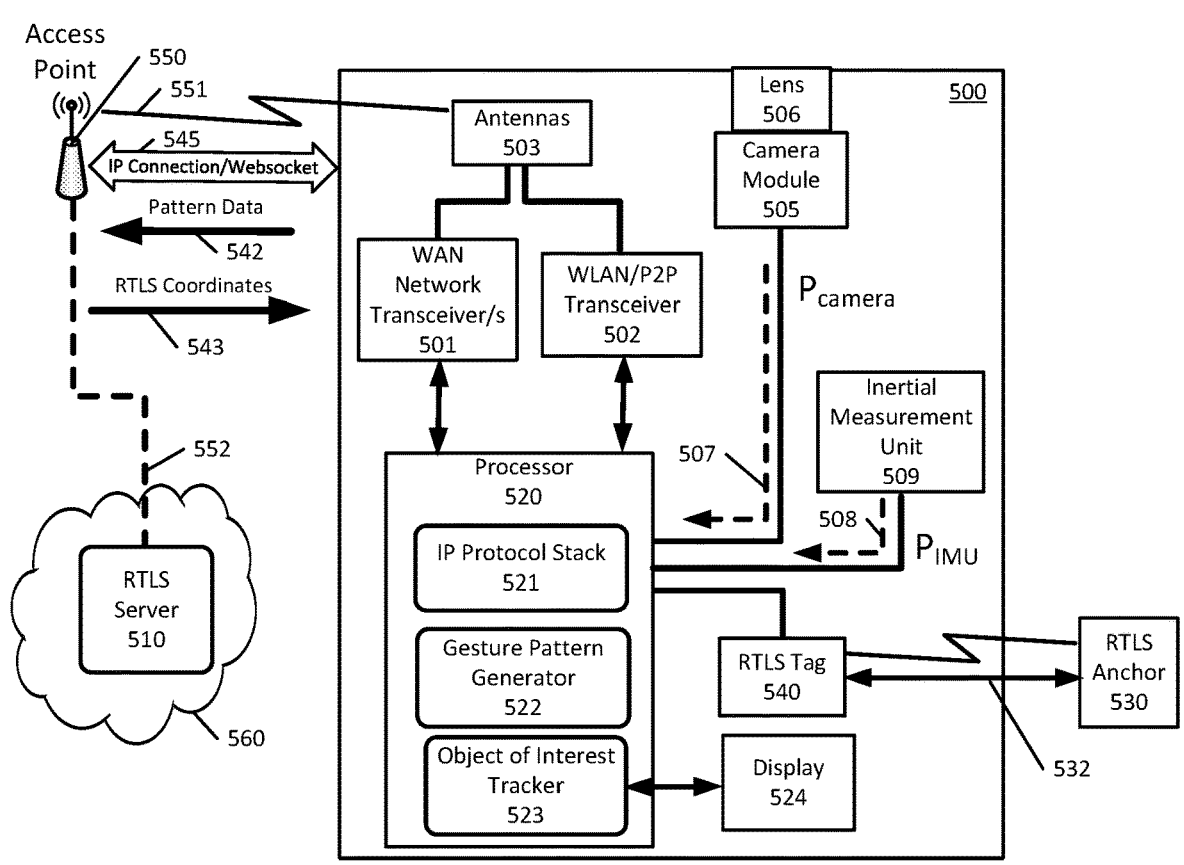
FIG. 5B

GESTURE BASED OBJECT IDENTIFICATION APPARATUS AND METHOD IN A REAL TIME LOCATING SYSTEM

FIELD OF THE DISCLOSURE

The present disclosure relates generally to real-time locating systems (RTLS) and mobile devices and more particularly to object identification within an RTLS.

BACKGROUND

In a real-time locating system (RTLS) an object that includes an RTLS mobile tag, or the mobile tag itself, is located by using its relationship with fixed anchors or otherwise by using the relationships between the mobile tag and fixed points in a mesh network. A central server can be employed to keep track of these objects, via their mobile tags, and their respective positions within a defined geographic perimeter. Such a defined geographic perimeter can be used to define a "geofence" which is a virtual fence around the defined geographic perimeter. In certain applications, a mobile device or a monitoring system within the RTLS system may also have a requirement for tracking one or more other moving objects, referred to as "objects of interest." For example, the object-of-interest's RTLS data can be obtained by an interested mobile device by accessing the central server, however the interested mobile device must be able to initially identify a specific moving object of interest in order to track its position.

This requires either manual entry of the object of interest's identification information at the interested mobile device, or using explicit visual markers for this task such as a "quick response code" (QR code) that the interested mobile device could scan to obtain the object-of-interest identification information. Such a process is non-intuitive.

Even if this non-intuitive process is used, other challenges exist because the node identifiers of the object of interest may change during reconfiguration of the system, which makes it difficult to automate object of interest tracking by the interested device. Further, manual data entry processes negate the use of covert security and safety systems that may employ tracking of objects of interest.

BRIEF DESCRIPTION OF THE DRAWINGS

FIG. 1A is a diagram of a real-time location system (RTLS) in accordance with some embodiments, and shows that any RTLS tagged object that has an RTLS tag attached or integrated internally, may be monitored and tracked as an object of interest by the RTLS.

FIG. 1B is a diagram of an RTLS as shown in FIG. 1A, in which each one of a group of mobile devices is an RTLS tagged object, and is assigned an object identifier in a perimeter location database.

FIG. 5A is a block diagram of an example mobile device in communication with an RTLS server in accordance with various embodiments, in which an RTLS tag is operative to communicate with an RTLS anchor tag via a ZeroMQ connection using ultrawide band radio.

FIG. 5B is a block diagram of an example mobile device as in FIG. 5A, in which the RTLS tag may communicate with the RTLS anchor tag over an ultrawide band radio link to obtain RTLS coordinates, and the mobile device may also communicate with an access point to establish an Internet Protocol connection to the RTLS server.

DETAILED DESCRIPTION

Figure 2A:
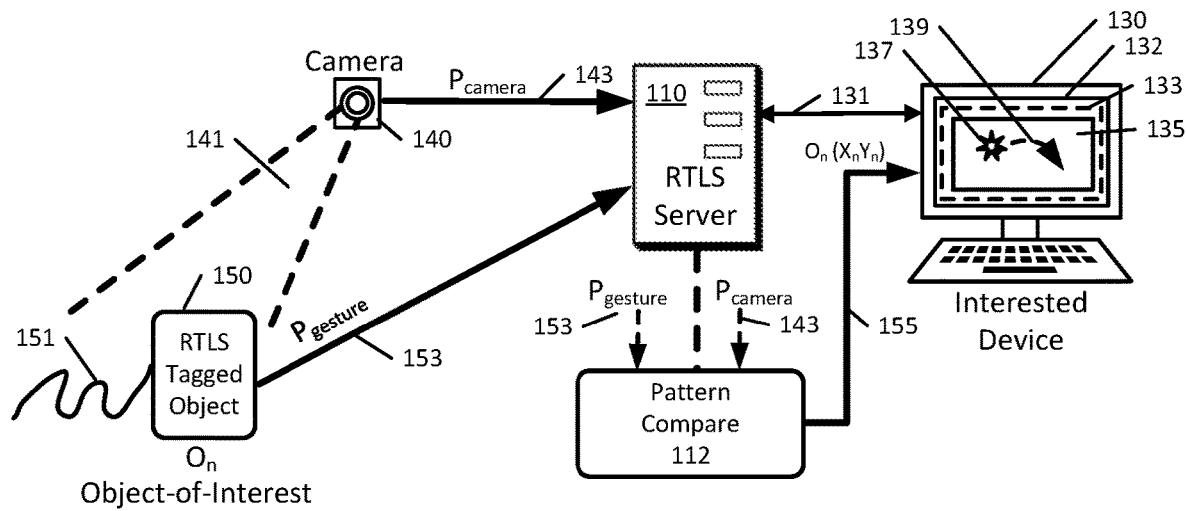
FIG. 2A is a diagram of an RTLS server obtaining gesture pattern data for an RTLS tagged object using a video camera, to identify the RTLS tagged object as an object of interest, and sending the RTLS coordinates of the object-of-interest to an interested device, in accordance with some embodiments.

Briefly, the present disclosure provides an apparatus and methods of operation for intuitively identifying an object of interest for a mobile device or other monitoring device, in a real-time locating system (RTLS). Using the disclosed embodiments, an interested device, which may be a mobile device or other monitoring device, may identify an RTLS tagged object as an object of interest, and receive the RTLS coordinates for the object of interest such that the interested mobile device or other monitoring device may visually track the object of interest on the interested device display. By obtaining the RTLS coordinates for the object of interest, the interested device may create a graphics overlay approximately at the object of interest RTLS coordinates on a displayed map, and track the movement of the object of interest on a displayed map in real time.

A disclosed method of operation includes: obtaining object gesture pattern data for an RTLS tagged object, in response to a gesture pattern motion of the RTLS tagged object; receiving camera gesture pattern data from a video camera, in response to the gesture pattern motion of the RTLS tagged object; determining that the object gesture pattern data matches the camera gesture pattern data; and sending the RTLS coordinates of the RTLS tagged object to a monitoring device, in response to the object gesture pattern data matching the camera gesture pattern data.

Another disclosed method of operation includes: receiving first gesture pattern data from an inertial measurement unit of a first mobile device, the first pattern data indicating a gesture motion by the first mobile device; receiving second pattern data from a camera of a second mobile device, the second pattern data representing the gesture motion by the first mobile device; determining that the first pattern data matches the second pattern data to verify that the second mobile device has visually captured the gesture motion of the first mobile device; and sending the second mobile device the RTLS coordinates of the first mobile device in response to the first pattern data matching the second pattern data.

A disclosed real time locating system (RTLS) includes an RTLS processor that is operative to receive motion pattern data from a mobile device inertial measurement unit (IMU) and from a mobile device camera, and to compare motion pattern data from an IMU and from a camera and determine that the two patterns match and correspond to the same mobile device. The RTLS includes at least a first mobile device, with a processor, an IMU and an RTLS tag, that is operative to send first pattern data from the IMU to the RTLS processor, where the first pattern data indicates a gesture motion by the first mobile device. The RTLS includes a second mobile device with a processor, a camera, and an RTLS tag, that is operative to send second pattern data from the camera to the RTLS processor, where the second pattern data represents the gesture motion by the first mobile device.

Turning now to the drawings wherein like numerals represent like components, FIG. 1 is a diagram of an example real time location system (RTLS) 100 in accordance with some embodiments. In FIG. 1A, the example RTLS 100 includes video cameras 140 and anchor tags 107 which are placed at various positions within an RTLS perimeter, which is the physical area monitored by the RTLS 100. Any object that has an RTLS tag attached or integrated internally, such as RTLS tagged object 150, may be monitored and tracked as an object of interest by the RTLS 100. The RTLS tags within RTLS tagged objects are operatively coupled to an RTLS server 110 via either a web socket Internet connection or via a ZeroMQ connection with one or more of the anchor tags 107. In the example of FIG. 1, the RTLS server 110 includes, or is operatively coupled to a perimeter location database 120. The perimeter location database 120 stores perimeter location data 121 which include X and Y coordinates for each one of the RTLS tagged objects within the RTLS 100 perimeter. The RTLS server 110 dynamically updates the perimeter location database 120 as the RTLS tagged objects move throughout the RTLS area.

The RTLS 100 includes at least three anchor tags 107A, 107B and 107C ("anchors"), and one of more video cameras 140, all of which are operatively coupled to the RTLS server 110 via connections 103. In the example shown, the RTLS tagged object 150 is connected to the RTLS server 110 via all three anchor tags 107A, 107B and 107C and receives or provides RTLS coordinate data 105 from and to each of the three anchor tags. The RTLS server 110 communicates with each of the three anchor tags 107A, 107B and 107C and performs triangulation calculations to determine the coordinates of the RTLS tagged object 150.

An example interested device 130, which may also be referred to herein as a "monitoring device," is operatively coupled to the RTLS server 110 via a web socket Internet connection 131, and shows a map 135 within a graphical user interface (GUI) 133 on a display 132. For an identified object of interest, the GUI 133 will display an overlay 137 such as, for example, an icon or avatar, at the RTLS 100 coordinate position within the map 135 and will subsequently track the movement 139 of the object of interest as it moves within the RTLS 100 area. For example, if the RTLS tagged object 150 is an object of interest, then the overlay 137, which may be an icon or avatar etc., will represent the position of RTLS tagged object 150 on the map 135.

In the example of FIG. 1B, each one of a group of mobile devices is an RTLS tagged object, and is assigned an object identifier in the perimeter location database 120. For example, "$O_1$" corresponds to mobile device 101, "$O_2$" corresponds to mobile device 109, "$O_3$" corresponds to mobile device 111, and so forth. In some embodiments, each one of the mobile devices communicates with the anchors 107 such that their positions within the RTLS are calculated by the RTLS server 110 by performing triangulation between the mobile devices and the anchors 107. However, in some embodiments the triangulation calculation may be done either by the RTLS server 110, or by the individual mobile devices, or by both. In the example RTLS 100, the mobile device 101 is designated as an "interested mobile device" (or "interested device") in that one or more of the other mobile devices is an object of interest that the mobile device 101 user wishes to track. Both the interested device 130 and mobile device 101 may be interested devices for the same or different objects of interest, and other mobile devices may act as interested devices as well. A mobile device may also be an interested device and an object of interest to another interested device at the same time. In other words, a mobile device may be tracking an object of interest and tracked as an objected of interest at the same time. The term "interested device" is used herein interchangeably with the term "monitoring device." Each mobile device display is operative to show a map of the perimeter location such as, but not limited to, a floor plan, similar to the map 135 displayed by interested device 130, when the mobile device functions as a monitoring device. A mobile device functioning as an interested device, or monitoring device, may visually track an object of interest by creating a graphics overlay approximately over the RTLS x-y coordinate points of the object of interest on the map. The graphics overlay can be a visual indicator, such as a colored dot, a picture, avatar or icon, or a text box showing information about the object of interest or any other suitable information that allows the user to visually track the object of interest as it moves throughout the geography covered by the RTLS 100. Although the example refers to a "perimeter location database," it is to be understood that other geofenced areas may exist within the perimeter and these geofenced areas may be tracked separately from the overall perimeter.

The video cameras 140 are operative to observe each of the RTLS tagged objects when such objects are within the respective field of view of one or more video cameras. The mobile devices are operatively coupled to the RTLS server 110, using an internal RTLS tag, via either a web socket Internet connection or via a ZeroMQ connection with one or more of the anchor tags 107. The perimeter location database 120 stores perimeter location data 121 which include X and Y coordinates for each one of the RTLS tagged mobile devices, within the RTLS 100 area. The RTLS server 110 dynamically updates the perimeter location database 120 as the mobile devices or other RTLS tagged objects, move throughout the RTLS area.

In the example shown in FIG. 1B, the mobile device 101 is connected to the RTLS server via all three anchor tags 107A, 107B and 107C and receives RTLS coordinate data 105 from each of the three anchor tags. The mobile device 101 may communicate with each of the three anchor tags 107 and the RTLS server 110 performs triangulation calculations to determine the mobile device 101 coordinates.

The examples of FIG. 2, illustrate methods of operation for identification of an object of interest in order to initiate tracking the object of interest within the RTLS 100 area. In FIG. 2A, the RTLS tagged object 150 is an object of interest for the interested device 130. The interested device 130 may be a remote monitoring system in some embodiments, or may be a mobile device. When the RTLS tagged object 150 moves in a gesture pattern 151, the RTLS server 110 receives gesture pattern data 153 ("Pgesture") according to the variance in the RTLS tagged object 150 RTLS coordinates. One or more of the video cameras 140, which have the RTLS tagged object 150 within a field of view 141 will also observe this motion with is sent to the RTLS server 110 as gesture data 143 ("Pcamera"). Pattern compare logic 112 in the RTLS server 110 compares the gesture data 153 and the gesture data 143 from the video camera 140 to identify the RTLS tagged object 150 as the object of interest. The pattern compare logic 112 may then send the RTLS data 155 for the RTLS tagged object 150 to the interested device 130. The interested device 130 may then display a overlay 137 on the map 135 and track the object of interest in real time on the GUI 133.

Figure 2B:
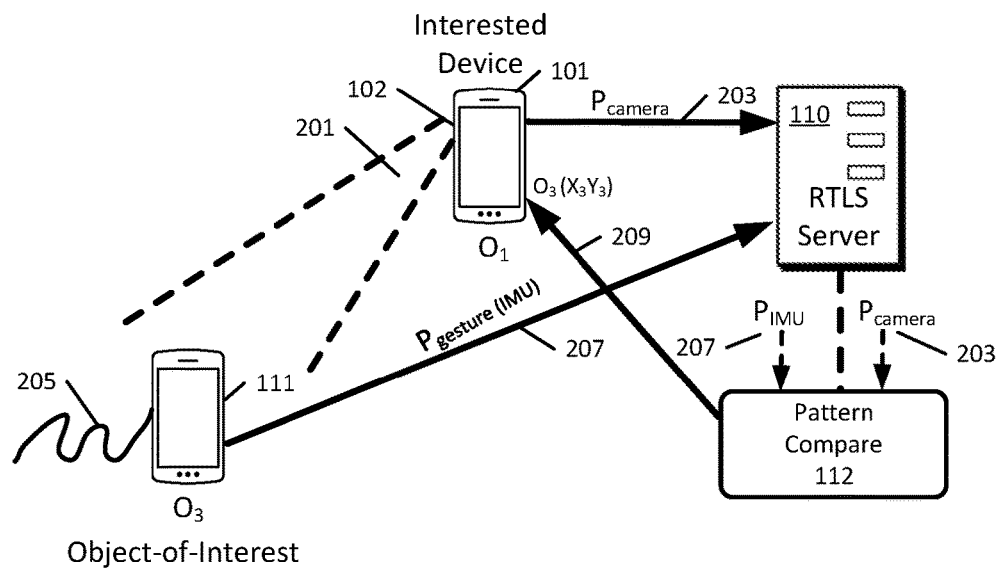
FIG. 2B is a diagram in which a mobile device indicates to the RTLS server that it is an interested device for a second mobile device as an object of interest, and the second mobile device indicates to the RTLS that it is the object of interest.

In the example of FIG. 2B, a mobile device indicates to the RTLS that it is an interested device for a second mobile device as an object of interest, and the second mobile device indicates to the RTLS that it is the object of interest. In the example, mobile device 101 in an interested device because the mobile device 101 user wishes to track mobile device 111 as an object of interest. The two mobile device users therefore each provide an input to the RTLS to make this identification. The mobile device 101 user may initiate this input by starting a mobile device camera 102 such that the mobile device 111 is in the camera 102 field of view 201. The mobile device 111 user than performs a gesture pattern 205 such as shaking the mobile device 111 in a zigzag pattern or some other pattern. The mobile device 111 inertial measurement unit (IMU) captures the gesture and a mobile device 111 processor generates pattern data 207 "$P_{IMU}$" and sends the gesture pattern data 207 to the RTLS server 110.

The mobile device 101 camera 102 captures this gesture motion in its field of view 201 and its processor generates gesture pattern data 203 "$P_{camera}$" and likewise sends the gesture pattern data 203 to the RTLS server 110. The RTLS sever 110 pattern compare logic 112 compares the gesture pattern data 203 with the gesture pattern data 207. The comparison may be accomplished using any suitable method such as a least squares curve fitting operation, etc. If the patterns are found to match, then the RTLS server 110 sends the interested device, mobile device 101, the RTLS coordinates 209 of the object of interest, i.e. mobile device 111 RTLS coordinates. Other data may also be sent such as, but not limited to, identification information for mobile device 111, its screen view, or other information.

Another method for associating the two mobile devices as interested device and object of interest may utilize the video cameras 140. For example, both users may face a given direction where they are both in the video camera field of view. Then each mobile device user may perform a like gesture, or two parts of a gesture. For example, both users may shake their respective mobile devices in a zig-zag pattern. The RTLS server will receive the IMU data from each mobile device, and the video camera will capture the gesture pattern for both devices. The RTLS server may, in this case, establish both devices as an interested device for the other, and each device as an object of interest for the other. Both devices will subsequently be able to track each other. The RTLS server can make this association because the video camera gesture data, along with the RTLS server, confirms that the users' intended to make this association with each other. In another example, the two users may each complete a portion of a gesture such as forming a large letter "X." One use may move the mobile device from the lower left side of their body to the upper right side to form one leg of the letter X, while the other user moves their mobile device from their upper left side to their lower left side to form the other leg. The video camera pattern data is used by the RTLS server to confirm the intended association between mobile device users. One leg or the other could be associated with "interested device" while the other is associated with "object of interest." Alternatively, the device that moved first could be designated as the interested device, etc. Various combinations of inputs are possible in accordance with the embodiments.

Figure 3:
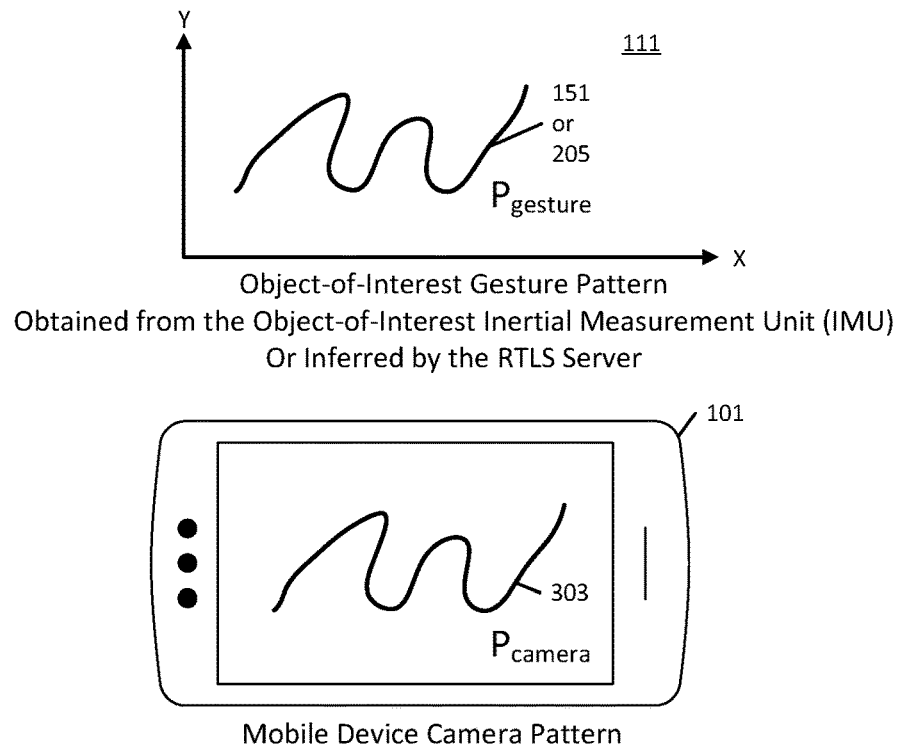
FIG. 3 is a diagram showing a representation of an example gesture pattern from either an object of interest inertial measurement unit (IMU) frame of reference or from the RTLS server frame of reference, and from a camera frame of reference, in accordance with various embodiments.
Figure 4:
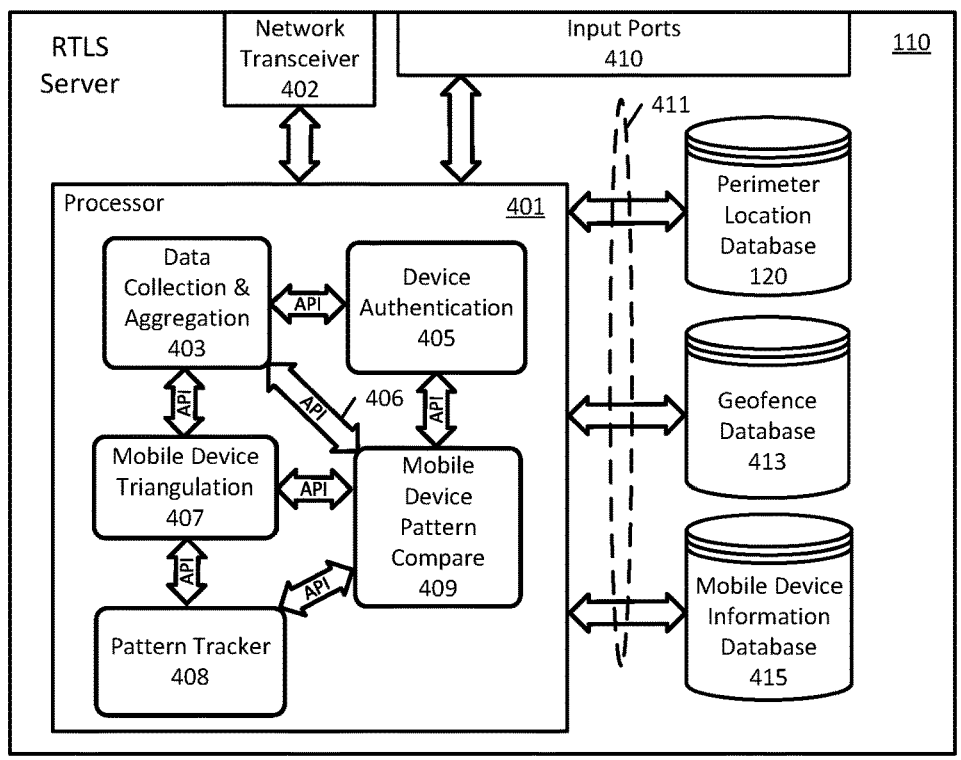
FIG. 4 is a block diagram of an example RTLS server in accordance with an embodiment.

FIG. 3 is diagram showing a representation of one example gesture pattern data of an RTLS tagged object which could be a mobile device. The gesture pattern data for a mobile device may be obtained from the mobile device IMU frame of reference, or may be inferred by the RTLS Server 110 observation of the mobile device movement in some embodiments. In the case of an RTLS tagged object that does not include an IMU, the gesture pattern data is inferred by the RTLS server 110. This gesture data is then compared to gesture data obtained from a camera which could be a fixed position video camera 140 or a mobile device camera. In the example of FIG. 3, the "interested device," i.e. mobile device 101, captures the pattern data 303 from its camera frame of reference by observing the object of interest, i.e. mobile device 111, using its camera. FIG. 4 is a block diagram showing further details of the RTLS server 110.

Turning to FIG. 4, the RTLS server 110 includes at least one processor 401 that is operatively coupled to one or more network transceivers 402 which enable the RTLS server 110 to communicate with mobile devices either via an IP connection using the Internet or various wide area networks, wireless local area networks, etc., or via a ZeroMQ connection to the anchor tags 107 using an ultrawide band radio transceiver. A set of input ports 410 are operative to connect with various networked devices such as video cameras 140, and/or anchor tags 107.

In some embodiments, the RTLS server 110 includes data collection and aggregation logic 403 which collects data and maintains the perimeter location database 120, geofence database 413 and mobile device information database 415. The various example databases shown in FIG. 4 may be stored on cloud servers remote from the RTLS server 110 but that are accessible to the RTLS server 110 via network connectivity. In some embodiments, one or more of the databases may also be distributed databases that are distributed among multiple cloud servers. In any of these embodiments, the processor 401 is operatively coupled to the databases using any of various appropriate database interface protocols 411 and network connectivity as needed in embodiments having remotely located or distributed databases.

The processor 401 is operative to execute the data collection and aggregation logic 403, mobile device triangulation logic 407, mobile device pattern tracker logic 408, mobile device pattern compare logic 409 and a device authentication function 405. The various logic components are operative to communicate data to and from each other via various application programming interfaces (APIs) 406. In some embodiments, the device authentication function 405 may reside on a different server that is operatively coupled to the RTLS server 110. The data collection and aggregation logic 403, among other things, handles receipt of the coordinate data collected by the various RTLS tagged objects including RTLS tagged mobile devices such as mobile device 101. The participating RTLS tagged mobile devices may send data to the RTLS server 110 if their respective privacy settings allow.

The geofence database 413 stores coordinates for various sub-perimeters which may be user defined. A specific geofence perimeter may be used as a "preamble" to gesture pattern recognition in some embodiments. For example, if a mobile device appears in a specific geofenced area this may serve as an indication (i.e. a "preamble") that the mobile device is getting ready to send gesture pattern data to the RTLS server 110.

FIG. 5 provides two block diagrams of an example mobile device 500 connected to an RTLS server 510 in accordance with embodiments. The mobile device 500 includes a processor 520 operative to execute an IP protocol stack 521 and a gesture pattern generator 522. A wireless wide area network (WAN) transceiver 501 provides wireless communication capabilities for one or more wide area network communications systems using any of various technologies such as, but not limited to, CDMA, UMTS, GSM, LTE, etc. and also provides Internet connectivity over the wireless interface to communicate with various servers such as the RTLS server 510. A second wireless transceiver, WLAN/P2P transceiver 502, provides wireless local area network connections, peer-to-peer connections, etc. and may provide wireless connectivity using technologies such as, but not limited to, WiFi®, Bluetooth®, Wireless USB, ZigBee, or other technologies, etc. The WLAN/P2P transceiver 502 may also provide Internet connectivity. Both the WAN transceivers 501 and the WLAN/P2P transceiver 502 are operatively coupled to antennas 503 which may include a single antenna, multiple antennas, an antenna array or some combination thereof. The mobile device may also include camera module 505 and a lens 506 as is familiar to most mobile device users. An inertial measurement unit (IMU) 509 may include a gyroscope, accelerometer and magnetometer, and is operative to generate and send data 508 to processor 520 to be used by the gesture pattern generator 522 to generate gesture pattern data 508 "$P_{IMU}$." Likewise, camera module 505 is operative to provide data 507 to processor 520 which is used by the gesture pattern generator 522 to generate gesture pattern data 507 "$P_{camera}$." The IMU 509 is also used to adjust a display 524 by sensing the position of the mobile device 500 as being horizontal or vertical, shaken or tilted or combinations thereof etc. The processor 520 is operative to control the display 524 to provide a graphical user interface (GUI) related to the RTLS system and to display a map and indicators corresponding to objects of interest that the mobile device 500 is visually tracking. The object of interest tracker logic 523 is operative to communicate with the display 524 and provide overlays on displayed maps, such as an overlay object on the map that represents an object of interest being tracked. The object of interest tracker 523 updates the position of the object of interest on the display by updating the overlay object (such as, but not limited to an icon or avatar) and may also receive RTLS coordinate updates for the object of interest from the RTLS server 510.

In the example of FIG. 5A, an RTLS tag 540 is operatively coupled to the processor 520 and is operative to communicate with an RTLS anchor tag 530 via a ZeroMQ connection 541 using ultrawide band radio. The RTLS tag 540 is operative to send pattern data 542 from the processor 520 to the RTLS server 510 and receive RTLS coordinates 543 for an object of interest in response. The pattern data communicated through the RTLS anchor tag 530 may be gesture pattern data 507 "$P_{camera}$," or gesture pattern data 508 "$P_{IMU}$" depending on whether the mobile device 500 is acting as an interested device or as an object of interest, respectively. The RTLS anchor tag 530 is operatively coupled to the RTLS server 510 via any appropriate backhaul 531.

In the example of FIG. 5B, the RTLS tag 540 may communicate with the RTLS anchor tag 530 over an ultra-wide band radio link 532 to obtain RTLS coordinates. However, the mobile device 500 may also communicate with an access point 550 using a WLAN radio link 551 to establish an Internet Protocol connection, web socket 545 to the RTLS server 510. The access point 550 provides connectivity 552 to the RTLS server 510 over the Internet 560. In the FIG. 5B example, the mobile device can send pattern data 542 to the RTLS server 510 over the web socket connection 545 and receive RTLS coordinates 543 for an object of interest. In the example embodiment of FIG. 5B, the mobile device 500 may not include the RTLS tag 540 and may communicate with the RTLS server 510 solely over the web socket connection 545.

Figure 6:
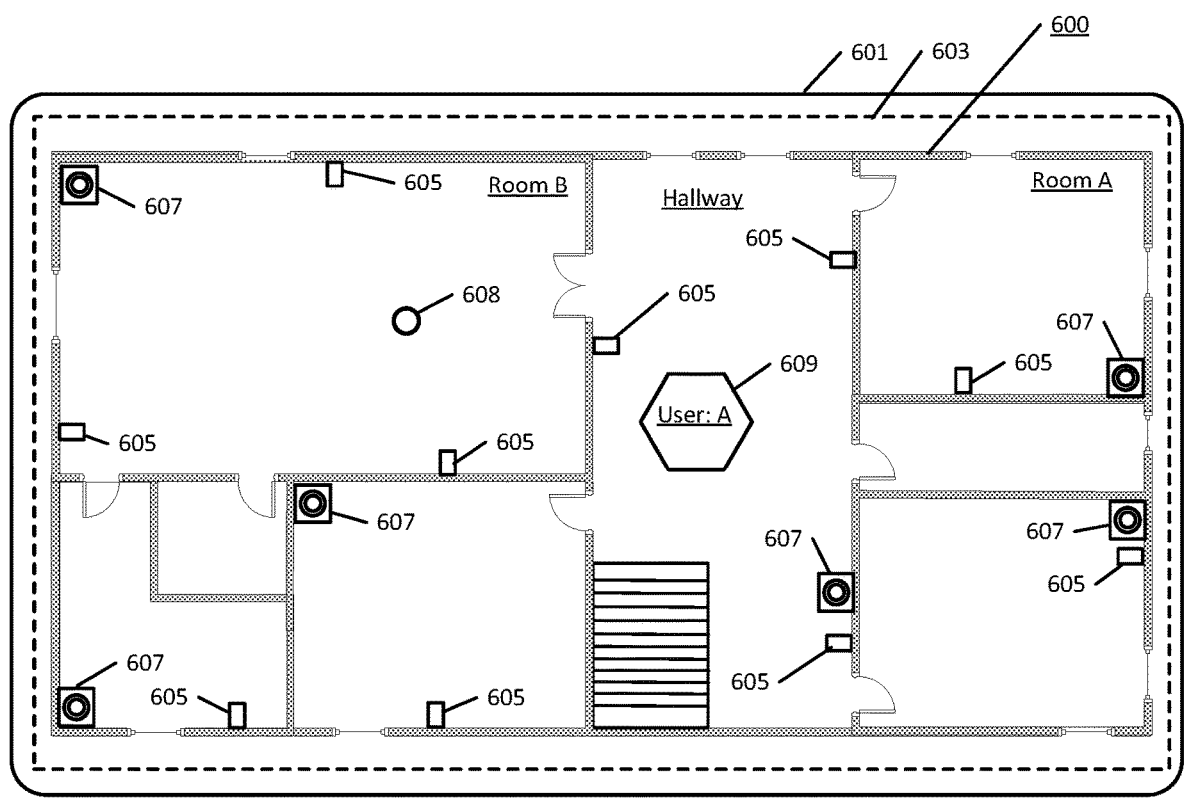
FIG. 6 is an example map of an RTLS perimeter, which in this example is a floor plan, displayed in a graphical user interface (GUI) on a display of an interested device.

FIG. 6 is an example map 600 that can be shown within a GUI 603 on an interested device display 601. The map 600 is a floor plan and may show the locations of anchor tags 605 and video cameras 607 in some embodiments. In this example, the interested device is a mobile device. The user's location which corresponds to the interested device location, is indicated by the circle overlay 608. The position of an object of interest is indicated by the hexagon overlay 609 and will move in real time as the object of interest associated with the hexagon overlay 609 moves within the RTLS area.

Figure 7:
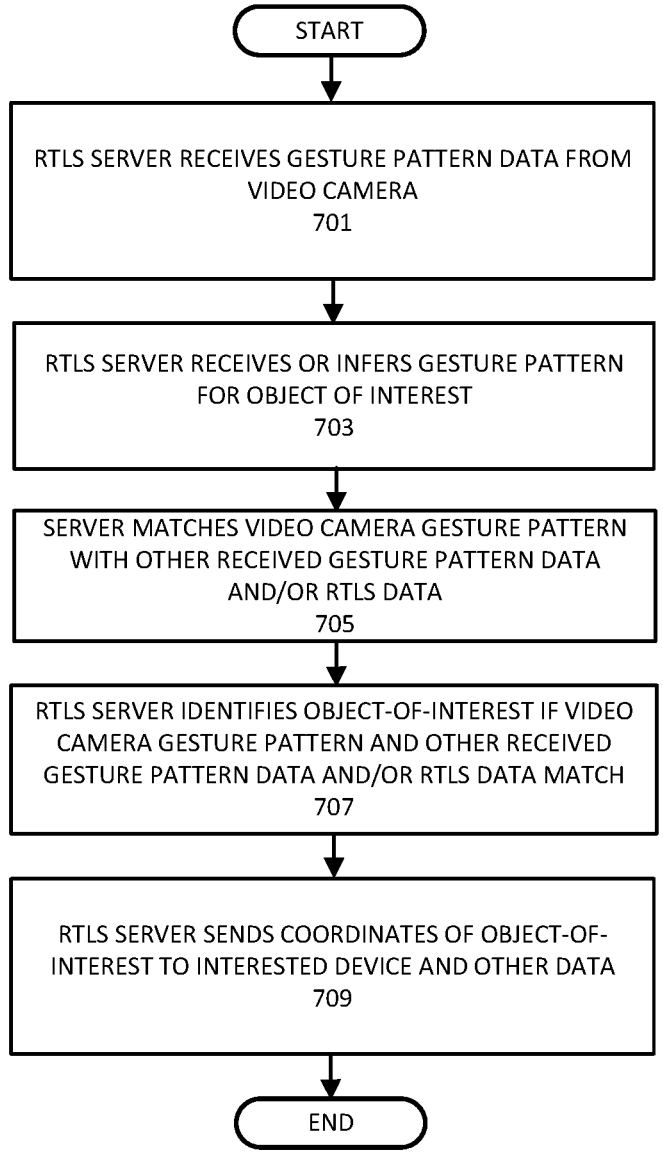
FIG. 7 is a flow chart of a method operation of an RTLS server in accordance with an embodiment.

FIG. 7 is a flow chart of an example method of operation of an RTLS server in accordance with an embodiment. The method of operation begins, and in operation block 701, the RTLS server receives a camera gesture pattern from a video camera. The video camera may be a fixed position video camera, such as a security system camera, or may be a mobile device camera. In operation block 703, the RTLS server receives or infers a gesture pattern for an object of interest. The RTLS server pattern tracker logic 408 may make this inference by detecting that an RTLS tagged object has generated a motion matching a gesture pattern that is associated with a control input. The RTLS server 110 monitors for these gesture patterns in real time. The term "gesture pattern" as used herein refers to two types of gesture motions. A first type of gesture motion is a control input motion that is known by the user/owner of an RTLS tagged object and is intentionally invoked by the user in order to invoke a response by the RTLS. For example, a mobile device user that wants to identify their mobile device as an object of interest to another mobile device user may perform the control gesture pattern motion while the interested mobile device user captures the gesture motion with their mobile device camera.

A second type of gesture motion is a control input motion that is not known to the user as a control input but is empirically known to the RTLS as being associated with a specific intent. For example, a mobile device that is held at a certain height and angle can be ascertained by the RTLS server as being used to make a phone call because the mobile device is at a person's height and tilted toward their ear. Likewise, various RTLS tagged objects can have associated motions indicative of the object being used in a certain manner. In a security context for example, some gestures may therefore be used to invoke designation of an RTLS tagged object as an object of interest and subsequently monitor its location. Various other use case scenarios likewise can benefit from monitoring objects of interest based on certain gestures of this second type. The second type of gesture pattern may also be used as a preamble to the first type of gesture pattern or vice versa. In other words, a preamble gesture may invoke timed monitoring to check whether the object engages in a second gesture at which point the object would become an object of interest.

In response to detection of a gesture pattern, the RTLS server pattern track logic 408 will look for matches in the video camera data and will look for any data sent to the RTLS server 110 from RTLS tagged devices including mobile devices. It is to be understood that the RTLS server 110 may detect the video camera gesture pattern first, of may detect the RTLS data change first or receive IMU gesture pattern data first. In other words, once the RTLS server 110 detects a gesture pattern in one form of input, it will search for the match in the other form of input, i.e. compare RTLS or IMU to camera data, or vice versa. Therefore, one form of gesture pattern data can either be obtained from the object of interest RTLS tag coordinate variance measured by the RTLS server 100, or from a mobile device IMU. In operation block 705, the server matches the camera gesture pattern with the RTLS data or IMU gesture pattern and determines the current location of the object that made the gesture pattern using the RTLS coordinate data. In operation block 707, the RTLS server identifies the object of interest if the video camera gesture pattern matches the gesture pattern obtained by either IMU gesture pattern data, or RTLS coordinate variance, or a combination of both. In operation block 709, the RTLS server sends coordinate data for the object of interest to the interested device. The RTLS server may also send other data such as, but not limited to, the object of interest device ID, screen recording, etc. The method of operation then ends as shown.

Figure 8:
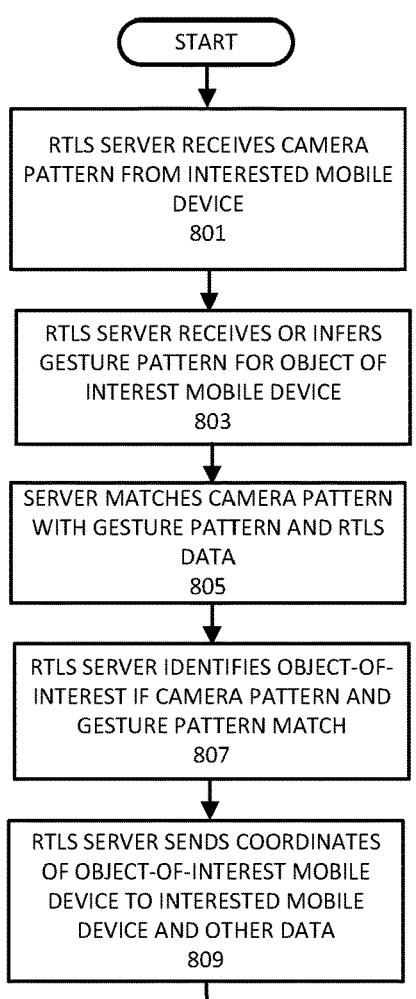
FIG. 8 is a flow chart of a method operation of an RTLS server in accordance with an embodiment.

FIG. 8 is a flow chart of an example method of operation of an RTLS server in accordance with an embodiment. The method of operation begins, and in operation block 801, the RTLS server receives a camera pattern from an interested mobile device. In operation block 803, the RTLS server receives or infers a gesture pattern from an object of interest mobile device. The gesture pattern can either be obtained from the object of interest mobile device IMU, or by the RTLS server mobile device pattern tracker logic 408 observation of RTLS coordinate variance. In operation block 805, the server matches the camera gesture pattern with the RTLS data or IMU related gesture pattern and determines the current location of the mobile device that made the gesture pattern from the RTLS coordinate data. In operation block 807, the RTLS server matches the camera gesture pattern with the RTLS data related or IMU related gesture pattern, or a combination of both, to identify the object of interest. In operation block 809, the RTLS server sends coordinate data for the object of interest mobile device to the interested mobile device. The RTLS server may also send other data such as, but not limited to, the object of interest device ID, screen recording, etc. The method of operation then ends as shown.

Figure 9:
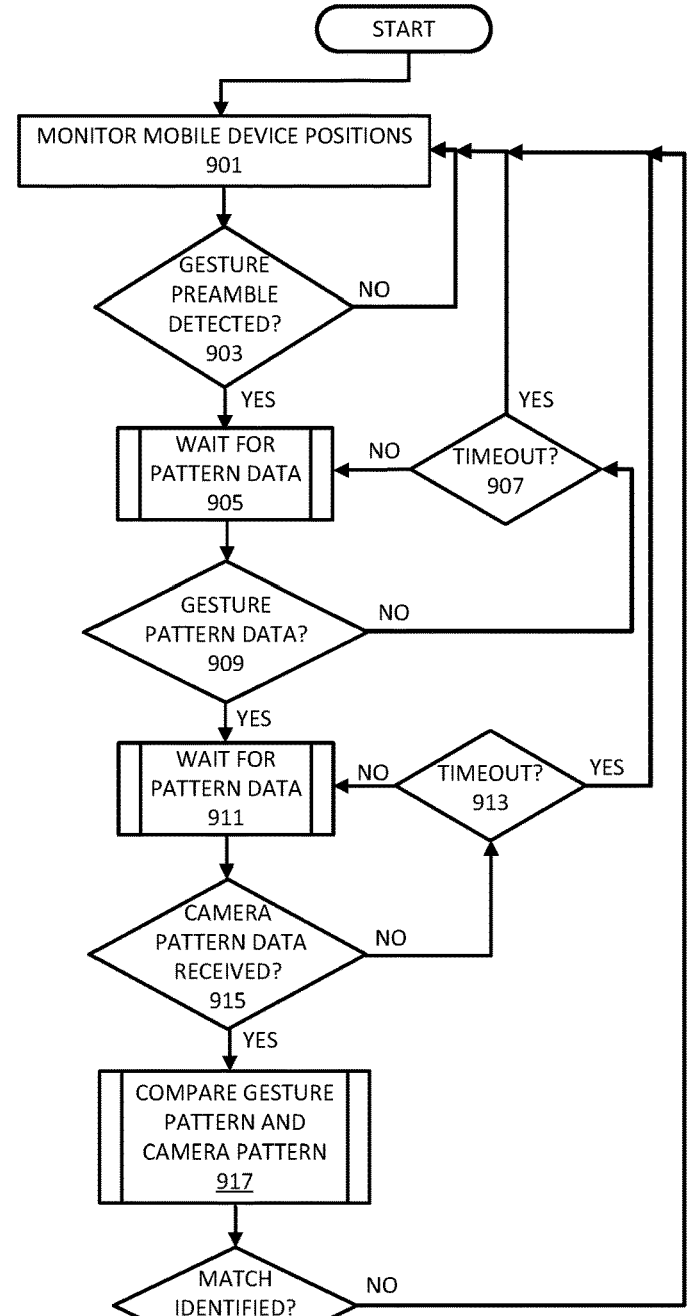
FIG. 9 is a flow chart of a method operation of an RTLS server in accordance with an embodiment.

FIG. 9 is a flow chart showing further details of a method operation of an RTLS server in accordance with an embodiment. In some embodiments, the operations shown in FIG. 9 will be performed by the RTLS mobile pattern tracker logic 408. The method of operation begins and in operation block 901, the RTLS server monitors the positions of various mobile devices within the system. In decision block 903, the RTLS server checks whether a gesture preamble was detected. A gesture "preamble" may be an initial gesture that indicates that a second gesture to designate an object of interest is about to occur. In another example, the gesture preamble may be that the mobile device has entered a specific geo-fenced area of the RTLS system perimeter. Until a gesture preamble is detected in decision block 903, the RTLS server monitors the mobile device positions in operation block 901. In operation block 905, the RTLS server waits for pattern data. If a gesture preamble is detected in decision block 903, the method proceeds to operation block 905 and the RTLS server waits for pattern data. If gesture pattern data is received or observed by the RTLS server in decision block 903, the method of operation proceeds to operation block 911 and waits for camera pattern data. If gesture pattern data is not received or observed at decision block 909, a timeout function 907 is checked. If the timer has not timed out at timeout function 907, the RTLS server continues to wait for gesture pattern data in operation block 905. However, if the timeout function 907 times out, the method of operation returns to operation block 901 and continues to monitor the mobile device positions.

If gesture pattern data is received or observed at decision block 903, as mentioned above, the RTLS server waits for camera pattern data in operation block 911. If camera pattern data is not received at decision block 915, a second timeout function 913 is invoked. If the timeout function 913 is not timed out, then the RTLS server will continue to wait for camera pattern data in operation block 911. However, if the timeout function 913 times out, then the method of operation again returns to operation block 901. If camera pattern data is received at decision block 915, then the RTLS server performs operation 917 and compares the gesture pattern, from IMU data or RTLS data, with the camera pattern to determine whether or not the patterns match.

If a match is not identified at decision block 919, then the method of operation again returns operation block 901. If a match is identified at decision block 919, then in operation block 921 the RTLS server identifies the matched mobile device that made the gesture pattern as the object of interest. In operation block 923, the RTLS server sends the object of interest perimeter coordinates to the interested mobile device. The interested mobile device can then create a graphics overlay for the object of interest on its display and visually track the object of interest. The method of operation then ends as shown. The RTLS server may also send the interested mobile device other data such as, but not limited to, the object of interest device ID, screen recording, etc.

Once an interested mobile device begins tracking an object of interest, the interested mobile device will continue to receive RTLS coordinates for the object of interest from the RTLS server such that it can update its display accordingly. This will continue until the object of interest either leaves the RTLS perimeter, or until the interested mobile device terminates tracking the object of interest.

Figure 10:
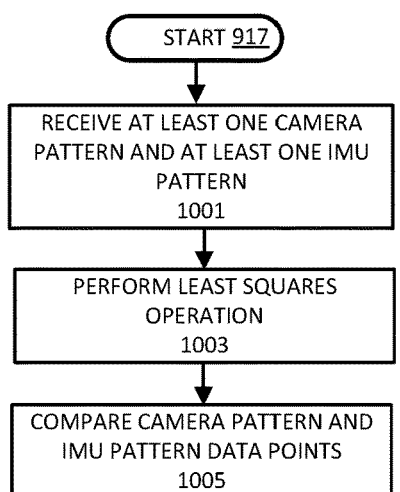
FIG. 10 is a flow chart of a method operation of an RTLS server in accordance with an embodiment.

FIG. 10 is a flow chart of an example compare operation 917 of an RTLS server in accordance with an embodiment. In operation block 1001, the RTLS server receives at least one camera pattern and receives or observes at least one gesture pattern. In operation block 1003, the RTLS server performs a least squares operation or some other mathematical operation that enables comparison of the patterns. In operation block 1005, the RTLS server compares the camera pattern and gesture pattern data points. The compare operation 917 then ends as shown. As discussed with respect to the flow chart of FIG. 9, the RTLS server proceeds to decision block 919 to determine if a match has been identified.

One of ordinary skill will understand and appreciate that the disclosed embodiments have various applications such as, but not limited to, gaming, security systems, etc. and such various applications are contemplated by the present disclosure.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method of operating a real time locating system (RTLS), the method comprising:
    obtaining object gesture pattern data for an RTLS tagged object, in response to a gesture pattern motion of the RTLS tagged object, the RTLS tagged object comprising an RTLS tag, the gesture pattern motion representing a control input motion intentionally invoked by a user;
    receiving camera gesture pattern data from a video camera, in response to the gesture pattern motion of the RTLS tagged object;
    determining that the object gesture pattern data matches the camera gesture pattern data; and
    sending RTLS coordinates of the RTLS tagged object to a monitoring device, in response to the object gesture pattern data matching the camera gesture pattern data.

2. The method of claim 1, further comprising:
    receiving camera gesture pattern data for a video camera of the monitoring device where the monitoring device is a mobile device, in response to the gesture pattern motion of the RTLS tagged object.

3. The method of claim 1, further comprising:
    receiving second object gesture pattern data for the monitoring device, where the monitoring device is a second RTLS tagged object, in response to a gesture pattern motion of the monitoring device; and
    receiving second camera gesture pattern data from a video camera, in response to the gesture pattern motion of the monitoring device.

4. The method of claim 1, further comprising:
    detecting a gesture preamble of the RTLS tagged object, prior to obtaining the object gesture pattern data.

5. The method of claim 4, wherein detecting a gesture preamble comprises:
    determining that the RTLS tagged object has entered into a geo-fenced area within an RTLS perimeter.

6. The method of claim 4, wherein detecting a gesture preamble comprises:
    determining that the RTLS tagged object has performed an initial predefined gesture.

7. The method of claim 1, wherein obtaining object gesture pattern data for an RTLS tagged object comprises:
    receiving the object gesture pattern data at an anchor tag using an ultrawide band radio link.

8. A real time locating system (RTLS), comprising:
    at least three RTLS anchor tags;
    at least one fixed position video camera;
    an RTLS processor, operatively coupled to the RTLS anchor tags and to the video camera, the RTLS processor operative to:
        obtain object gesture pattern data from an RTLS tagged object via the anchor tags, the RTLS tagged object comprising an RTLS tag, the gesture pattern representing a control input motion intentionally invoked by a user;
        receive a camera gesture pattern from the video camera;
        determine that the object gesture pattern and camera gesture patterns match; and
        send RTLS coordinates of the RTLS tagged object to a monitoring device, in response to the object gesture pattern data matching the camera gesture pattern data.

* * * * *